United States Patent [19]

Kupczyk et al.

[11] Patent Number: 5,250,332

[45] Date of Patent: Oct. 5, 1993

[54] HEAT-SHRINKABLE ENVELOPE HAVING LOW-TEARING SUSCEPTIBILITY

[75] Inventors: Andreas Kupczyk; Volker Heinze, both of Hagen, Fed. Rep. of Germany

[73] Assignee: RXS Schrumpftechnik Garnituren GmbH, Fed. Rep. of Germany

[21] Appl. No.: 421,123

[22] Filed: Oct. 13, 1989

[30] Foreign Application Priority Data

Oct. 18, 1988 [DE] Fed. Rep. of Germany ....... 3835471

[51] Int. Cl.$^5$ .............................. F16L 11/02; H01R 4/00
[52] U.S. Cl. ................................ 428/34.9; 428/35.1; 428/156; 428/163; 428/167; 428/345; 174/DIG. 8; 138/123
[58] Field of Search ............. 428/34.9, 35.1, 212, 428/167, 156, 161, 162, 163, 34.5; 138/156, 157, 170, 123; 174/DIG. 8

[56] References Cited

U.S. PATENT DOCUMENTS

| | | | |
|---|---|---|---|
| 3,542,077 | 11/1970 | Muchmore | 138/99 |
| 4,569,868 | 2/1986 | De Blauwe et al. | 428/34.5 |
| 4,803,103 | 2/1989 | Pithouse et al. | 428/34.5 |
| 4,816,316 | 3/1989 | Robbins, III | 428/161 |
| 4,952,438 | 8/1990 | Kipfelsberger et al. | 428/68 |
| 4,957,790 | 9/1990 | Warren | 428/34.9 |

FOREIGN PATENT DOCUMENTS 1925739 8/1970 Fed. Rep. of Germany .

*Primary Examiner*—George F. Lesmes
*Assistant Examiner*—Charles R. Nold
*Attorney, Agent, or Firm*—Hill, Steadman & Simpson

[57] ABSTRACT

A heat-shrinkable envelope of crosslinked polymeric plastic material is composed of regions having different amounts of shrinkability which regions are disposed uniformly over the entire area of the envelope. The difference in the regions of shrinkability can be obtained by different amounts of crosslinking, by different geometric shapes for the two regions or a combination of both. The regions can be arranged in sandwich-like layers or can be arranged in alternately-arranged, parallel-extending bands. The regions having the lower shrinkability resist tearing and continued tearing of the regions with the high shrinkability and the region with the high shrinkability insure a proper shrinking of the envelope onto the article or material being surrounded thereby.

16 Claims, 4 Drawing Sheets

HEAT-SHRINKABLE ENVELOPE HAVING LOW-TEARING SUSCEPTIBILITY

BACKGROUND OF THE INVENTION

The present invention is directed to a heat-shrinkable envelope of crosslinked, polymeric plastic material having portions of different degrees of crosslinking to form a tight closure of an article.

U.S. Pat. No. 3,542,077, whose disclosure is incorporated by reference and which was the basis of German Published Application 19 25 739, discloses various crosslinked preforms and a method for the manufacture of the preforms. For example, the preforms are composed of a layer of crosslinked, unmeltable polymer material which is separated from a second layer composed of a meltable, essentially uncrosslinked polymer material by an impermeable barrier layer which is interposed therebetween. Such preforms are shaped as pipes and form a heat-shrinkable structure having an outer heat-shrinkable part and a second inner meltable part that serves the purpose of forming a seal. When the heat-shrinkable part is damaged, for example along an edge, then the shrinking forces acting during the shrinking process can cause continual tearing that can lead to rendering the preform useless. The melting layer that lies below the crosslinkable layer cannot alleviate this situation, since the melting of the material cancels the needed strength. This continued tearing predominantly occurs transversely relative to the shrinking direction.

SUMMARY OF THE INVENTION

The object of the present invention is to create a heat-shrinkable envelope that has adequate resistance to mechanical injury, particularly to tearing or, respectively, continued tearing. This object is inventively achieved with a heat-shrinkable envelope which has at least two plastic components having different degrees of shrinking forces which components are arranged uniformly distributed over the entire surface of the envelope so that one plastic component has a high degree of shrinking force that guarantees optimum shrinkability and whereby the other plastic component has a low degree of shrinking force that is adapted to optimum mechanical resistance to tearing. These envelopes will have specific geometrical shaping and an arrangement that will promote the desired effect.

A noticeable reduction of the susceptibility to tearing and continued tearing is guaranteed for the manufacture of heat-shrinkable articles, for examples collars or pipes, by the structural format, as well as by the method for the manufacture thereof, when compared to the present state of the art. In traditional heat-shrinkable articles, injury to the surface due to notching, incisions, cuts and contact with a heated surface, for example with a propane gas burner needed for heat-shrinking or the like, will lead to destruction of the article due to continued tearing. The present invention is directed to topically or locally limiting the continued tearing, or even entirely suppressing the tearing, by inserting regions that will neutralize the tearing and the continued tearing. Such regions that neutralize tearing or continued tearing can be achieved in a variety of ways.

One preferred measure for achieving the tear-neutralizing region comprises a noticeably different crosslinking of these regions in comparison to the remaining mass of the crosslinked, shrinkable material. In the expanded or stretched condition, more highly crosslinked regions have the higher back-shrinking forces required for shrinking to the original shape and they inherently are subject to tearing when they are prevented from shrinking back to the original shape during the shrinking process. Regions having lower crosslinking have a lower shrinking force and, thus, they hardly contribute to the shrinking process and they are considered more resistant to the continued tearing transversely relative to the shrinking direction. An incipient tear, which is due to injury or incisions, is arrested in a direction extending perpendicular to the shrinking direction in this region of low shrinking forces.

A simple manufacture occurs on the basis of co-extrusion of crosslinkable, polymeric materials having different crosslinking characteristics and subsequent electron beam crosslinking. This succeeds in an especially simple way with different levels of doping with a crosslinking promoter, selected from a group consisting of triallyl cyanurate (TAC), triallyl isocyanurate (TAIC), ethylene glycol dymethyl acrylate (EDMA) and the like.

In one embodiment of the tear neutralizing regions of the invention, the arrangement obtainable by co-extrusions is carried out, for example, in a layered fashion in what is referred to as a "sandwich structure", whereby the respective degrees of crosslinking of the individual plastic layers are different.

Another possibility of manufacturing heat-shrinkable surfaces of the invention also occurs when the regions of plastic materials that have different degrees of shrinking forces are arranged as parallel strips extending next to one another in alternation, wherein the shrinking direction ultimately proceeds perpendicular to the parallel arrangement of individual regions after the shape memory has been impressed thereon. For example, regions of material having a low and a high proportion of crosslinking accelerators, thus, alternate in the extrusion, so that the regions having different degrees of crosslinking that are preferably arranged parallel arise in subsequent electron beam crosslinking.

The object on which the invention is based can also be implemented or, respectively, improved on the basis of suitable geometric shapes and formatting of the heat-shrinkable surfaces or material that is matched thereto. Thus, corresponding combinations with additional mechanical reinforcements broadens the range of applications.

A further measure for achieving or, respectively, reinforcing the tear-neutralizing regions is composed of a subsequent lowering of the shrinking force of these regions after expansion or stretching on the basis of a selective re-crosslinking of these regions, whereby the re-crosslinking in the expanded condition reduces the back-shrinking forces.

Other advantages and features of the invention will be readily apparent from the following description of the preferred embodiments, the drawings and claims.

DESCRIPTION OF THE PREFERRED EMBODIMENTS

The principles of the present invention are particularly useful when incorporated in a shrinkable envelope SH. The shrinkable envelope SH is of a structure in accordance with the invention which has a tear susceptibility considerably reduced or abated. This envelope SH is manufactured in a sandwich structure and is composed, for example on its outside, of a highly crosslinked polymer material MH, and a layer of weakly crosslinked polymeric material MN that is in contact with the layer MH. In the basic concept, however, the two polymeric materials are identical or at least so compatible with one another that good adhesion therebetween will occur. At a shrinking temperature, however, both layers composed of the polymeric materials are not yet, meltable, wherein the shrinking effect predominantly occurs from the highly crosslinked material MH, which has a high shrinking force, although both layers have been extended or stretched together with one another for impressing the shape memory.

The inventive effect is based precisely on the different behavior of the polymeric foils during the shrinking process. The low degree of crosslinking in the material component MN is just high enough that it does not melt at the shrink temperature and has a low shrinking force as compared to the layer MH.

A melting layer, for example a layer composed of a known hot-melt adhesive SK, can be additionally applied to the inwardly directed side for providing a seal in the direction toward the enveloped article. The manufacture of such an envelope or, respectively, subsequently shrinkable surfaces, preferably occurs by extrusion wherein the extrusion direction ER, in this case, is expediently placed such that the corresponding beads W can be coformed along the two longitudinal edges. These beads W, for example, are used as closure elements together with clamp rails that embrace these beads W in a known manner. The dilation or stretch direction and, thus, the shrinking direction SR, as well, is selected to extend perpendicular to the extrusion direction ER so that the envelope, after it has been wrapped around an article with the beads W adjacent each other and held by the clamp rails, can be shrunk onto the enveloped article. When an injury to the surface occurs, given this envelope SH, a tearing or continued tearing, as well, are prevented by the second layer MN, which is nearly free of shrinking forces. The weak crosslinking at the layer MN, however, also prevents this layer from melting at the shrink temperature.

Figure 1:
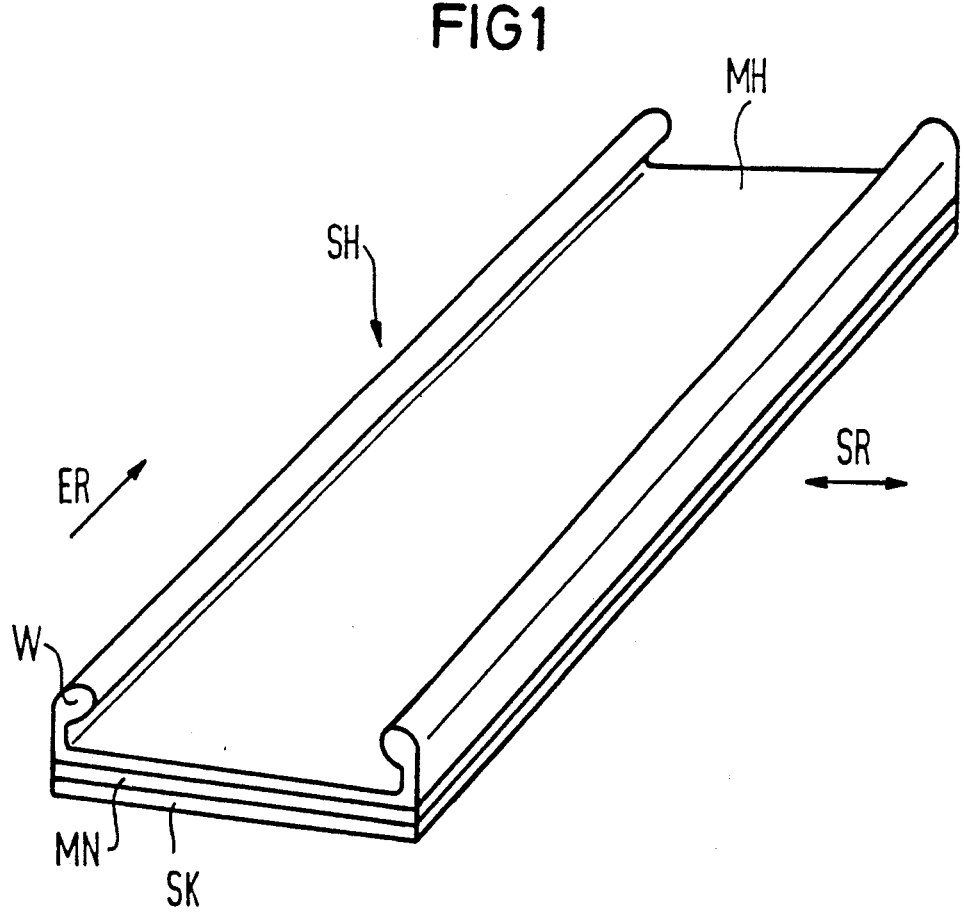
FIG. 1 is a perspective view of a heat-shrinkable envelope having a sandwich structure.

The embodiment illustrated in FIG. 1 is a sandwich formation, however it is not limited to two differently crosslinkable layers. An arbitrary number of layers having different crosslinking that are arranged in alternation is also conceivable. A limitation may be seen only in terms of the economic aspects. Further, the first, outer layer can be a weakly crosslinked layer MN and the first layer lying therebelow can be a highly crosslinked layer MH.

Figure 2:
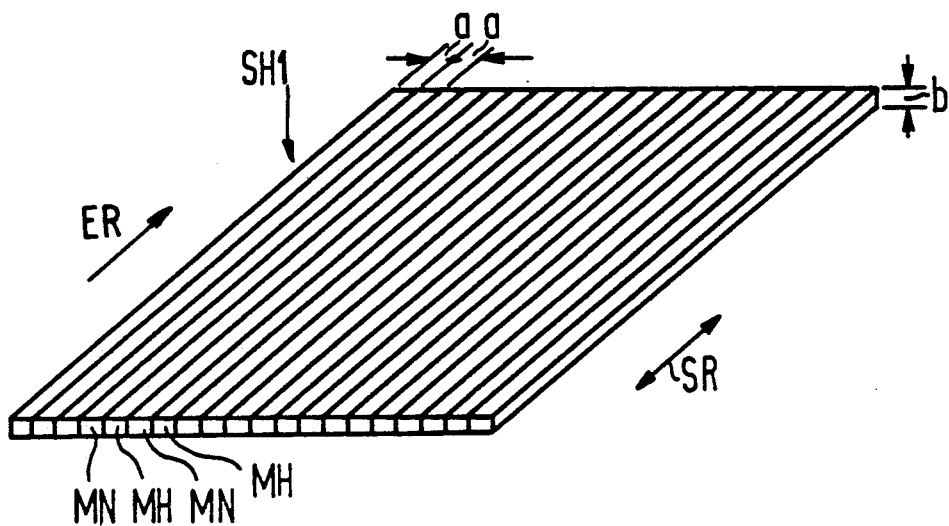
FIG. 2 is a perspective view of a heat-shrinkable film having regions with different crosslinking characteristics lying in parallel.

In the embodiment illustrated in FIG. 2, a shrinkable envelope or foil SHI could be constructed with lateral closure elements. In this case, it is inventively composed of regions of polymeric materials having different degrees of crosslinking that are arranged in alternate-lying, side-by-side strips that extend parallel to one another. Namely, the regions having weakly crosslinked polymeric material MN and regions of highly crosslinked polymeric material MH are alternating strip-like regions. The alternations of these regions again guarantee that an injury to the surface cannot spread over a greater distance, since regions having weakly crosslinked material, i.e., the regions having the lower shrinking forces, always intervene. The width of each and every region is preferably about the same, however this is not compulsory. Dependent on the desired strength or the application, different dimensional relationships can also be utilized. The thickness b of the shrinkable envelope SH1 can, likewise, be selected as needed; however, it is usually smaller than the width dimension a of the strips. This foil or envelope can also be manufactured in a simple way with an extrusion process, wherein the shrink direction SR is also the extrusion direction ER and is a result of the impressed-shape memory by a stretching or expanding after an electron irradiation.

Figure 3:
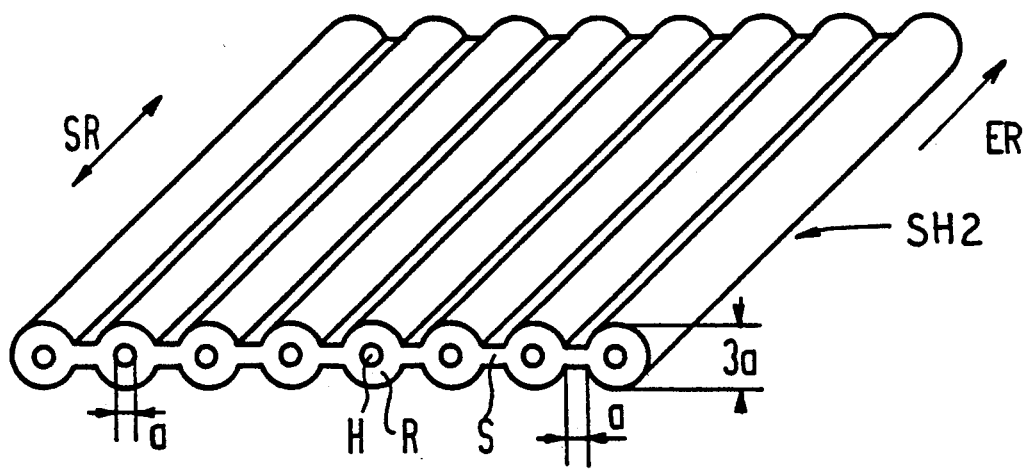
FIG. 3 is a perspective view of a heat-shrinkable film having a low tear susceptibility as a result of suitable geometrical shapes.

Another, or third, exemplary embodiment of the invention for a shrinkable surface or foil, particularly a shrinkable envelope or foil SH2, is illustrated in FIG. 3. Herein, the reduction of the tearing susceptibility given damage is achieved with a specific shaping of the surface or foil. A geometric form is selected here wherein a region for preventing continuous tearing is fashioned at a tapering location of planar construction. A longitudinally extruded surface of the envelope or foil SH2 of small longitudinally proceeding tubes R, which have cavities H with a cavity diameter a and webs S, which lie between the tubes R, is selected. It is thereby especially beneficial when the outside diameter of the small tubes R is about three times as large as the diameter a of their cavity H. The webs S situated between the two small tubes R are each as wide as the diameter a of the cavity H. However, these dimensions can also be fixed in some other way in accordance with the respective application. Given shrinking in the indicated shrink direction SR, the shrink force, at the thickened part or the tubes R, are higher than in the webs S, due to the geometric shaping, so that the region that stops a tearing or continued tearing are, again, formed in this way. The extrusion direction ER is, likewise, the same as the later shrink direction SR.

Given this structure, moreover, a further layer structure is possible in combination therewith. For example, a melting layer composed of a hot-melt adhesive or with other modified layers that correspond to the respective application can be applied to this foil SH2.

Figure 4:
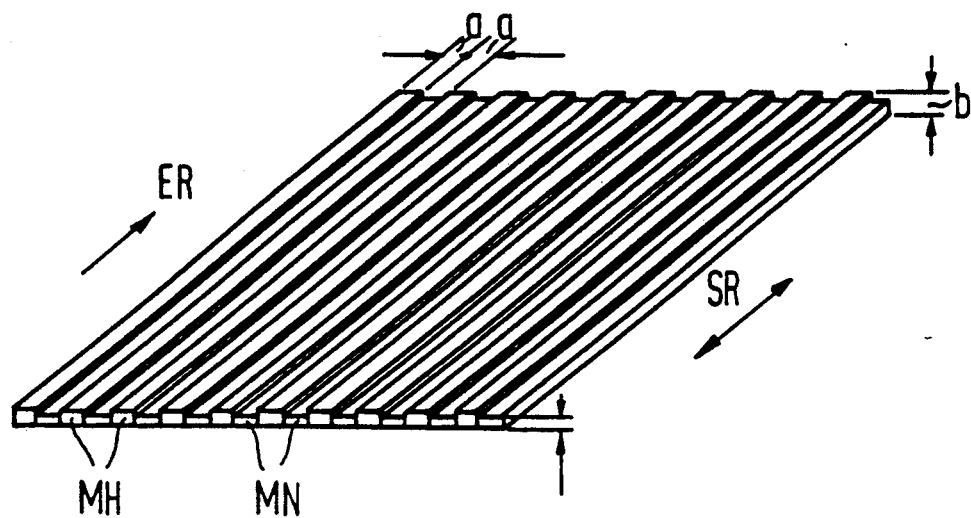
FIG. 4 shows a modified embodiment of the heat-shrinkable film according to FIG. 2.

A fourth exemplary embodiment of the invention is illustrated in FIG. 4 and has regions for preventing the continued tearing, given surface damage, which are composed of a combination of the exemplary embodiments of FIGS. 2 and 3. For example, regions MN and MH have different degrees of crosslinking and extend parallel to one another in the longitudinal direction ER and are combined as regions that have a geometric shaping that impedes the continued tearing. The shaping, for example, is defined in that the regions have different thicknesses so that a sudden change of the shrinking force occurs at the discontinuity between two adjacent regions. The two effects, thus, augment one another and, thus, promote the resistance. The dimensional relationships herein can also be adapted to the requirement, however, especially beneficial contradictions will occur when the regions having the different degrees of crosslinking are equal in width and that the regions having the highly crosslinked material MH have a height b and the regions having the weakly crosslinked material MN have a height which is one-third of the height b.

Figure 5:
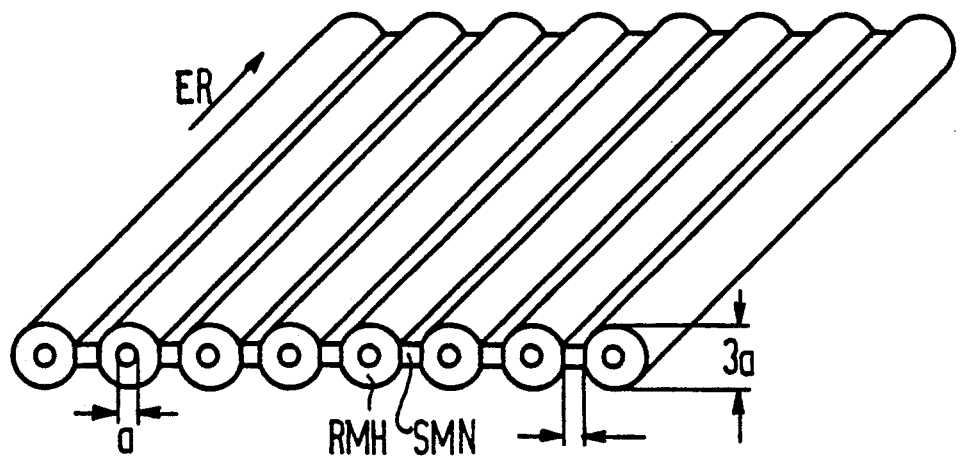
FIG. 5 is a perspective view of a modified embodiment of the heat-shrinkable film according to FIG. 3.

A fifth exemplary embodiment of the invention is illustrated in FIG. 5 and corresponds to the fourth embodiment of FIG. 4. However, a small tube structure of FIG. 3, again, is used as a basis. In addition to the formation of the regions that prevent continued tearing as a result of the suitable shaping, different regions having different degrees of crosslinking are also used. For example, the webs S of the embodiment of FIG. 3 are now composed of weakly crosslinked polymeric materials SMN and the previously-known small tubes are formed of a highly crosslinked polymeric material RMH. This surface can also be manufactured in a simple way by co-extrusion of the polymeric materials having different proportions of crosslinking accelerators that are then subject to crosslinking process with electron irradiation. After the expansion or dilation perpendicular to the extrusion direction ER under known conditions, the surface has a shrinkability that takes effect when heated. The tearing or continued tearing can, thus, also be prevented here in the above-mentioned way by the alternation of weakly crosslinked and highly crosslinked polymeric materials.

In a modification of the embodiment of FIG. 5, the weakly crosslinked regions SMN of FIG. 5 can be fashioned to be wider and, as warranted, completely embed the highly crosslinked, small tubes RMH.

Figure 6:
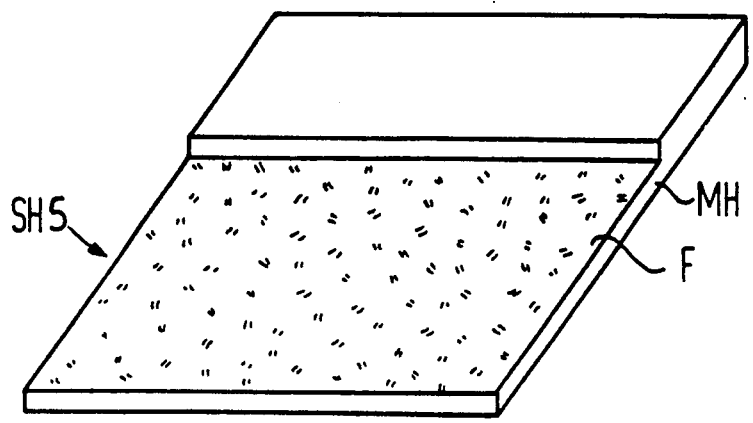
FIG. 6 is a perspective view with portions broken away of a heat-shrinkable film having embedded reinforcing elements in the form of fibers.

Another embodiment of the shrinkable envelope is generally indicated at SH5 in FIG. 6 and is composed of different polymeric layers in which a fiber F of polymers or of polymer-compatible materials, such as glass, have been embedded. Either individually or together with other layers, the fibers F herein act as a region that prevents further tearing and also, additionally, create a mechanical reinforcement of the heat-shrinkable article. For example, fabrics or weaves of the fibers F can also be embedded in this embodiment, whereby the fabric or weave can have firm or loose nodes. Both alone and, as well, as in union with the fabric or weave, the fibers F, themselves, can also have shrink properties, given the application of heat, so that an additional shrinking intensification will occur overall. In such a case, the fibers themselves are, likewise, crosslinked and are, subsequently, stretched under the suitable conditions and, thus, provided with a shape memory.

Figure 7:
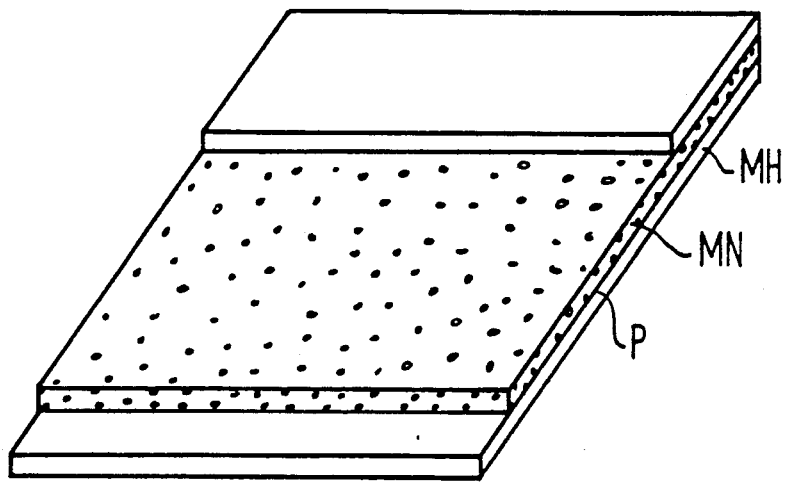
FIG. 7 is a perspective view with portions broken away showing a heat-shrinkable film of the present invention having an insert composed of a foam polymer film.

A still further embodiment is illustrated in FIG. 7, wherein a crosslinked and heat-shrinkable polymer film, particularly a polyethylene film, is employed in a sandwich structure, together with other layers of differently crosslinked polymeric materials. Prevention of further tearing is then optimally met when the weakly crosslinked layer MN is a porous layer containing pores P that are uniformly distributed and when the pore volume does not amount to more than 30% of the volume of the layer MN. The pores P form regions that additionally prevent further tearing. As illustrated, this layer MN is placed on the layer MH and can be sandwiched between two layers, if desired.

Finally, the effect of which the invention is based can also be achieved when the surface SH or, respectively, the envelopes SH contain regions in alternation that are irradiated or, respectively, more or less unirradiated with electron beams. The manufacture of the regions having different degrees of crosslinking is, thus, created in the irradiated process in this way. Such a different irradiation region occurs with corresponding coverings, for example, by placing a lead grating thereon or with similar measures, such as providing a mask.

In general terms, the idea of the invention is that the polymeric material is composed of first regions having defined shrink forces, as well as second regions which have lower or less shrink forces. The first regions effect the necessary heat deformation of the article and the second regions, by contrast, cause a prevention of further tearing, given damage to a surface of the envelope or film.

Essential constituents for the plastic material are preferably polymeric compounds and will contain a polymer selected from a group consisting of partially crystalline polyolefine, for example, high-density polyethylene (HDPF), low-density polyethylene (LDPE), linear ethylene copolymers (LLDPE and LMDPE) in a proportion of 60-90% instead of an individual, partially crystalline polyolefine, a blend of, for example, different polyethylenes, can be employed in an arbitrary combination; as warranted, the ethylene copolymers have comonomers with polar characteristics, for example, those selected from a group consisting of vinyl acetate and butyl acrylate in proportions of 5-30%; and fillers, particularly lampblack in proportions of 1-25%. In addition, these copolymer compounds contain anti-aging agents, particularly anti-oxidants from a group of sterically inhibited phenols and amines, as warranted, processing aids and crosslinking promoters in different dopings.

Although various minor modifications may be suggested by those versed in the art, it should be understood that we wish to embody within the scope of the patent granted hereon all such modifications as reasonably and properly come within the scope of our contribution to the art.

We claim:

1. A heat-shrinkable envelope of crosslinked polymeric material for forming a tight closure on articles, said envelope having means for preventing a continued tearing of the envelope and including the envelope being formed of two plastic components having different degrees of shrinking forces, said means having the components being regularly distributed over the entire surface of the envelope as a band structure with side-by-side parallel extending, alternating narrow first and second bands, each of said first and second bands having a width corresponding to the thickness of the band, said bands extending across the width of the envelope, the first bands being a first of said two plastic components having a high degree of shrinking force that guarantees optimum shrinkability, and the second bands being a second of the two plastic components having a shrinking force that provides an optimum mechanical resistance for preventing a continuing tearing of the envelope, each of said plastic components having substantially similar crosslinking and the different degrees of shrinking forces of the bands of the structure being due to the profile structure of special geometric shaping and arrangement for the bands of the different components to cause said difference in shrinking forces.

2. A heat-shrinkable envelope according to claim 1, wherein the first bands having the higher shrinking forces are small tubes, said alternating second bands and small tubes proceed longitudinally relative to the shrink direction, an the second bands disposed between the small tubes having the high resistance to tearing.

3. A heat-shrinkable envelope according to claim 1, wherein the first bands have a greater thickness than the second bands.

4. A heat-shrinkable envelope of crosslinked polymeric material for forming a tight closure on articles, said envelope having means for preventing a continued tearing of the envelope and including the envelope being formed of two plastic components having different degrees of shrinking forces, said means having the components being regularly distributed over the entire surface of the envelope as a band structure with side-by-side parallel extending, alternating narrow first and second bands, each of said first and second bands having a width corresponding to the thickness of the band, each of said first bands having a cross sectional area different than the cross sectional area of each of the second bands, said bands extending across the width of the envelope, the first bands being a first of said two plastic components having a high degree of shrinking force that guarantees optimum shrinkability, and the second bands being a second of the two plastic components having a shrinking force that provides an optimum mechanical resistance for preventing a continuing tearing of the envelope.

5. A heat-shrinkable envelope according to claim 4, wherein the two components have a different degree of crosslinking to create different shrinkage forces, said different degrees of crosslinking being accomplished by said components having different amounts of a crosslinking accelerator selected from a group consisting of triallyl cyanurate, triallyl isocyanurate and ethylene glycol dimethylacrylate.

6. A heat-shrinkable envelope according to claim 4, wherein the two components have different degrees of crosslinking and said different degrees are accomplished by an electron irradiation.

7. A heat-shrinkable envelope according to claim 4, wherein the shrink direction proceeds in a direction of the parallel arrangement of said bands.

8. A heat-shrinkable envelope according to claim 4, wherein an auxiliary film of a material selected from a group consisting of high-density polyethylene (HDPE) and low-density polyethylene (LDPE) are placed on the envelope, said auxiliary films having a potentially weak crosslink.

9. A heat-shrinkable envelope according to claim 4, wherein the second bands of low shrinkage forces includes fibers of polymeric materials selected from a group consisting of crosslinked polyolefines, thermoplastic elastomers, polyamides and polyesters, said fibers being embedded in the plastic material having the high shrinkability.

10. A heat-shrinkable envelope according to claim 4, wherein the second bands having a low shrinkability are formed by fibers of polymer-compatible substances, such as glass fibers, being embedded in a portion of the material having the high shrinkability.

11. A heat-shrinkable envelope according to claim 4, which includes fibers being embedded in one of the plastic materials, said fibers being shrinkable.

12. A heat-shrinkable envelope according to claim 4, which includes fibers in the form of a weave-like fabric being embedded in the plastic material to form the second bands having low-shrinkage forces.

13. A heat-shrinkable envelope according to claim 4, wherein the two plastic components have different degrees of crosslinking and are provided with different doses of crosslinking accelerators, said components being co-extruded and subject to electron irradiation and then being stretched longitudinally relative to the course of the shrinkage region that differs in degree.

14. A heat-shrinkable envelope according to claim 4, wherein the bands of plastic materials having different shrinkability are manufactured with different intensities of electron irradiation, particularly by selective covering to prevent electron irradiation of the second bands having the low shrinkability.

15. A heat-shrinkable envelope according to claim 4, wherein the plastic components preferably contain a partially crystalline polyolefine selected from a group consisting of high-density polyethylene (HDPE), low-density polyethylene (LDPDE), linear ethylene copolymers (LLDPE and LMDPE) in a proportion of 90–95% and a blend of crystalline polyolefines with various polyethylenes in arbitrary composition, potentially ethylene copolymers with comonomers having polar characteristics being selected from a group consisting of vinyl acetate and butyl acrylate in proportions of 5–30%; and fillers, particularly lampblack, in proportions of 1–25%, said polymer, compounds containing anti-aging means, particularly anti-oxidants, from a group of sterically inhibited phenols and amines and selected processing aids in crosslinking promoters.

16. A heat-shrinkable envelope of crosslinked polymeric material for forming a tight closure on articles, said envelope having means for preventing a continued tearing of the envelope and including the envelope being formed of two plastic components having different degrees of shrinking forces, said means having the components being regularly distributed over the entire surface of the envelope as a band structure with side-by-side parallel extending, alternating narrow first and second bands, each of said first and second bands having a width corresponding to the thickness of the band, said bands extending across the width of the envelope, the first bands being a first of said two plastic components having a high degree of shrinking force that guarantees optimum shrinkability, the second bands being a second of the two plastic components having a shrinking force that provides an optimum mechanical resistance for preventing a continuing tearing of the envelope, the first plastic component of the firs bands having a high shrinking force being a highly crosslinked material and the second plastic component of the second bands having a low shrinking force being a weakly crosslinked material, said first bands having a greater cross sectional dimension than the second bands.

* * * * *